(12) United States Patent
Foland et al.

(10) Patent No.: US 11,790,790 B2
(45) Date of Patent: Oct. 17, 2023

(54) METHODS AND APPARATUSES FOR GENERATING AN ELECTRIC AIRCRAFT FLIGHT PLAN

(71) Applicant: BETA AIR, LLC, South Burlington, VT (US)

(72) Inventors: Steven J. Foland, Garland, TX (US); Nicholas Warren, South Burlington, VT (US); John Charles Palombini, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/575,416

(22) Filed: Jan. 13, 2022

(65) Prior Publication Data
US 2023/0222925 A1     Jul. 13, 2023

(51) Int. Cl.
| | |
|---|---|
| G08G 5/00 | (2006.01) |
| B64D 27/24 | (2006.01) |
| G05D 1/10 | (2006.01) |
| B64D 43/00 | (2006.01) |
| B64C 29/00 | (2006.01) |

(52) U.S. Cl.
CPC ........... G08G 5/0034 (2013.01); B64C 29/00 (2013.01); B64D 27/24 (2013.01); B64D 43/00 (2013.01); G05D 1/102 (2013.01)

(58) Field of Classification Search
CPC ...... G08G 5/0034; B64C 29/00; B64D 27/24; B64D 43/00; G05D 1/102
See application file for complete search history.

(56) References Cited

U.S. PATENT DOCUMENTS

| | | | |
|---|---|---|---|
| 9,310,222 B1 * | 4/2016 | Suiter | G08G 5/0091 |
| 9,324,236 B2 | 4/2016 | Estkowski et al. | |
| 9,454,151 B2 | 9/2016 | Srivastava et al. | |
| 10,026,326 B1 * | 7/2018 | Villele | G08G 5/0047 |
| 10,262,545 B2 | 4/2019 | Waltner et al. | |
| 10,515,554 B1 * | 12/2019 | Shamasundar | G01C 23/005 |
| 10,650,686 B2 | 5/2020 | Evans et al. | |
| 10,837,786 B2 | 11/2020 | Tian et al. | |
| 2010/0100308 A1 * | 4/2010 | Coulmeau | G08G 5/006 701/122 |
| 2016/0246304 A1 * | 8/2016 | Canoy | G01M 17/00 |
| 2016/0347446 A1 * | 12/2016 | Vetter | B64C 27/30 |

(Continued)

FOREIGN PATENT DOCUMENTS

CN     113379172 B   * 11/2021

OTHER PUBLICATIONS

Svetlana Dicheva, Yasmina Bestaoui, Trajectory generation in a 3D flight plan with obstacle avoidance for an Airborne Launch Craft, Jul. 4, 2011.

*Primary Examiner* — Donald J Wallace
*Assistant Examiner* — Jalal C Coduroglu
(74) *Attorney, Agent, or Firm* — CALDWELL INTELLECTUAL PROPERTY LAW

(57) ABSTRACT

An apparatus for generating an electric aircraft flight plan, where the apparatus includes a sensor and controller. The electric aircraft includes a sensor that is configured to detect a position of an electric aircraft, generate a position datum, and transmit the position to a flight controller. The electric aircraft also includes a database of recommended flights. The recommended flight plan is displayed on a display in the electric aircraft.

20 Claims, 7 Drawing Sheets

(56) References Cited

U.S. PATENT DOCUMENTS

| | | | |
|---|---|---|---|
| 2018/0086445 A1* | 3/2018 | Combs | B64C 3/44 |
| 2018/0157261 A1* | 6/2018 | Kuhlmann | B64D 31/06 |
| 2018/0334251 A1* | 11/2018 | Karem | B64C 5/02 |
| 2018/0336409 A1* | 11/2018 | Schultz | G06F 16/51 |
| 2019/0047342 A1 | 2/2019 | Dietrich | |
| 2019/0057611 A1* | 2/2019 | Kneuper | G08G 5/0091 |
| 2019/0263515 A1* | 8/2019 | Karem | B64D 27/24 |
| 2019/0291859 A1* | 9/2019 | Manning | B64U 50/11 |
| 2019/0329882 A1* | 10/2019 | Baity | B64C 29/0033 |
| 2019/0340933 A1 | 11/2019 | Villa | |
| 2020/0273349 A1* | 8/2020 | De Villele | B64D 45/00 |
| 2020/0290742 A1* | 9/2020 | Kumar | B64D 27/24 |
| 2020/0327814 A1 | 10/2020 | Adolf et al. | |
| 2021/0070457 A1* | 3/2021 | Wiegman | B64D 27/24 |
| 2021/0201686 A1 | 7/2021 | Villa et al. | |
| 2021/0225180 A1 | 7/2021 | S et al. | |
| 2021/0253268 A1* | 8/2021 | Borges | G01C 23/005 |
| 2021/0343160 A1* | 11/2021 | Venkataramana | G08G 5/0034 |
| 2022/0005362 A1* | 1/2022 | Suiter | G08G 5/003 |

\* cited by examiner

METHODS AND APPARATUSES FOR GENERATING AN ELECTRIC AIRCRAFT FLIGHT PLAN

FIELD OF THE INVENTION

The present invention generally relates to the field of electric aircrafts. In particular, the present invention is directed to apparatuses and methods for generating an electric aircraft flight plan.

BACKGROUND

In an electric aircraft, a flight plan is necessary to help a pilot or autopilot to navigate from one location to another. However, existing flight plans can often be inefficient.

SUMMARY OF THE DISCLOSURE

In an aspect, an apparatus for generating an electric aircraft flight plan includes a sensor installed in an electric aircraft and configured to detect a position of the electric aircraft and generate a position datum based on the position of the electric aircraft; a controller installed on the electric aircraft and communicatively connected to the sensor, the computing device configured to: receive the position datum from the sensor; determine a current phase of flight of the electric aircraft based on the position datum; and generate a recommended flight plan based on the electric aircraft's current phase of flight, wherein generating the recommended flight plan further comprises: determining a maximally cost-effective flight plan; and generating the recommended flight plan as a function of the maximally cost-effective flight plan. In another aspect, a method for generating an electric aircraft flight plan. The method comprises detecting, by sensor, a position of an electric aircraft. The method further comprises generating, by sensor, a position datum based on a position of an electric aircraft. The method further comprises determining, by a computing device, a current phase of flight of an electric aircraft using the position datum. Lastly, the method comprises generating, by the computing device, a recommended flight plan, including a most cost-effective flight plan.

In another aspect, a method for generating an electric aircraft flight plan includes detecting, using a sensor, a position of the electric aircraft; generating, using the sensor, a position datum based on a position of the electric aircraft; receiving, by a computing device, a position datum from the sensor; determining, by a computing device, a current phase of flight of the electric aircraft using the position datum; and generating, by the computing device, a recommended flight plan based on the electric aircraft's current phase of flight, wherein the recommended flight plan further comprises of determining a maximally cost-effective plan; and generating the recommended flight plan as a function of the maximally cost-effective plan.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating an electric aircraft flight plan. In an embodiment, aspects of the present disclosure may be incorporated into the cockpit of an electric aircraft.

Aspects of the present disclosure can be used to detect the position of the aircraft and generate a recommended flight plan based on the position. Aspects of the present disclosure can also be used to display the most cost-effective flight plan. This is so, at least in part, because the controller is configured to receive position information and generate a flight plan. Exemplary embodiments illustrating aspects of the present disclosure are described below in the context of several specific examples.

Figure 1:
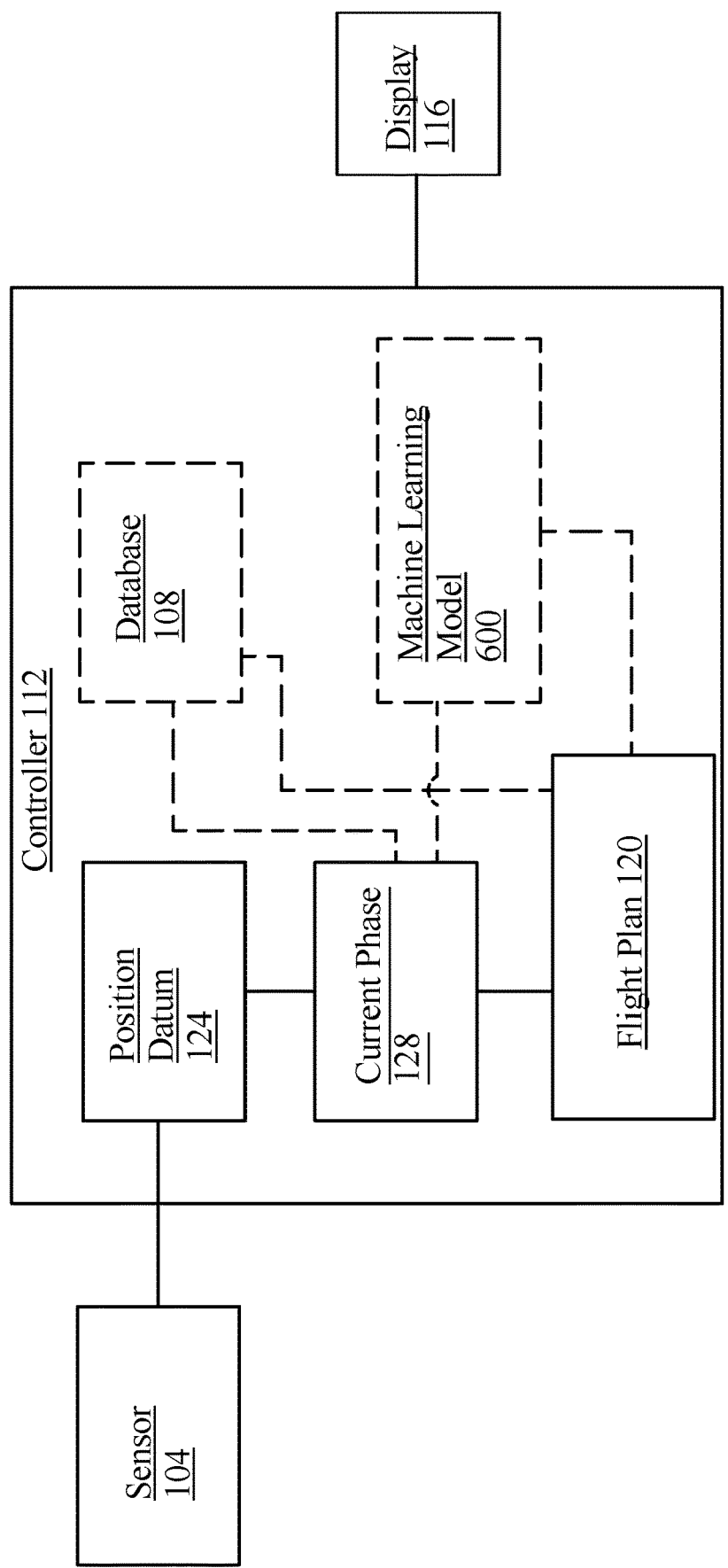
FIG. 1 is a block diagram of an electric aircraft flight plan apparatus.

Referring now to FIG. 1, an exemplary embodiment of an apparatus 100 is presented. The apparatus 100 is configured to recommend a cost-effective flight plan based on the current phase of flight 128. Apparatus 100 includes a sensor 104, position datum 124, and a controller 112; apparatus 100 may include a database 108, display 116, a flight plan 120, and a machine learning model 400. The apparatus 100 may be incorporated in an electric aircraft or other electrically powered vehicle, for instance as described below. Apparatus 100 may be further incorporated into a vertical takeoff and landing aircraft. As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, apparatus 100 includes a sensor 104 which is configured to detect a position of the aircraft. As used in this disclosure, a "sensor" is a device, module, and/or subsystem, utilizing any hardware, software, and/or any combination thereof to sense a characteristic, a phenomenon, and/or changes thereof, in an instant environment; sensor may store and/or transmit resulting measurements electronically. Sensor 108 is configured to detect, but not limited to, a position. Sensor 104 may incorporate a geospatial sensor. Geospatial sensor may include light detection and ranging (LIDAR), global positioning system (GPS), optical scanning, and the like. The sensor 104 is configured to detect a position of the aircraft and generate a position datum 124. The position of the aircraft includes the orientation of the aircraft relative to a reference element, velocity, flight plan, and the like. Position datum 124 also includes current phase of flight 128. Apparatus 100 may use current phase of flight 128 to generate a recommended flight plan, as discussed below. As used in this disclosure, "orientation" is a datum describing an attitude and spatial position of the aircraft relative to any suitable reference frame or point. For example, orientation may include, without limitation, data describing attitude, pitch, yaw, and/or roll. Reference element for the orientation of the aircraft may include ground, gravity vector, etc.

In one or more embodiments, sensor 104 may include an altimeter that may be configured to detect an altitude of aircraft. In one or more embodiments, sensor 104 may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, sensor 104 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. In some embodiments, sensor 104 may include a meteorological radar that monitors weather conditions. In some embodiments, sensor 104 may include a ceilometer. The ceilometer may be configured to detect and measure a cloud ceiling and cloud base of an atmosphere. In some embodiments, the ceilometer may include an optical drum and/or laser ceilometer. In some embodiments, sensor 104 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 104 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor 104 may include a lightning detector. The lightning detector may be configured to detect and measure lightning produced by thunderstorms. In some embodiments, sensor 104 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 104 may include an inertia measurement unit (IMU). The IMU may be configured to detect a change in specific force of a body.

In one or more embodiments, sensor 104 may include a local sensor. A local sensor may be any sensor mounted to aircraft that senses objects or phenomena in the environment around aircraft. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 104 may include a navigation sensor. For example, and without limitation, a navigation system of aircraft may be provided that is configured to determine a geographical position of aircraft during flight. The navigation may include a Global Positioning System (GPS), an Attitude Heading and Reference System (AHRS), an Inertial Reference System (IRS), radar system, and the like.

In one or more embodiments, sensor 104 may include electrical sensors. Electrical sensors may be configured to measure voltage across a component, electrical current through a component, and resistance of a component. In one or more embodiments, sensor 104 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 104, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

In one or more embodiments, sensor 104 may include a sensor suite which may include a plurality of sensors that may detect similar or unique phenomena. For example, in a non-limiting embodiment, sensor suite may include a plurality of accelerometers, a mixture of accelerometers and gyroscope. Apparatus 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, apparatus includes a controller 112. Controller 112 may include any computing device as described in this disclosure, including without limitation a microcontroller, microprocessor, digital signal processor (DSP) and/or system on a chip (SoC) as described in this disclosure. Controller 112 may include, be included in, and/or communicate with a mobile device such as a mobile telephone or smartphone. Controller may include, be included in, and/or communicate with a flight controller as described in further detail below. Controller 112 may include a single computing device operating independently, or may include two or more computing device operating in concert, in parallel, sequentially or the like; two or more computing devices may be included together in a single computing device or in two or more computing devices. Controller 112 may interface or communicate with one or more additional devices as described below in further detail via a network interface device. Network interface device may be utilized for connecting controller 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 112 may include but is not limited to, for example, a computing device or cluster of computing devices in a first location and a second computing device or cluster of computing devices in a second location. Controller 112 may include one or more computing devices dedicated to data storage, security, distribution of traffic for load balancing, and the like. Controller 112 may distribute one or more computing tasks as described below across a plurality of computing devices of computing device, which may operate in parallel, in series, redundantly, or in any other manner used for distribution of tasks or memory between computing devices. Controller 112 may be implemented using a "shared nothing" architecture in which data is cached at the worker, in an embodiment, this may enable scalability of apparatus 100 and/or computing device.

With continued reference to FIG. 1, controller 112 may be designed and/or configured to perform any method, method step, or sequence of method steps in any embodiment described in this disclosure, in any order and with any degree of repetition. For instance, controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, controller 112 may be programmed to follow a flight plan based on current conditions. "Flight plan," for the purposes of this disclosure, is a predefined plan that is followed by the aircraft that denotes the most efficient way to get from the departure point to the arrival point with respect to variables such as safety, efficiency, cost effectiveness, and the like. For example, and without limitation, flight plan 120 may denote things to the aircraft such as flight altitude, status of charge of the battery, method of landing, distance to a recharging station, area to avoid, weather, head winds, and the like. In some embodiments, flight path may also include information related to obstacles and restricted zones that must be avoided. Additionally, an aircraft may undergo a plurality of different phases of flight during a completion of a flight plan. For example and without limitation, the flight phases may include a planning phase, lift-off/take-off phase, climb phase, cruise phase, descent phase, approach phase, taxi phase, hover phase, landing phase, and the like thereof. At different phases of flight, the optimal flight path may vary. For example, different phases of flight exert different amounts of power on various systems. The flight plan 120 may denote whether an eVTOL aircraft should use rotor-based flight or fixed wing-based flight while it is departing, arriving, or traveling along the flight path. In this disclosure, a rotor-based method of flying and a wing-based method of flying are distinct "flight modes" where the first method uses a different source of lift from the second component; a change of flight mode may include, without limitation, a change from hovering and/or rotor-based flight to fixed wing flight or the like. Flight plan may include, without limitation, any set of instructions followed by a flight controller as described in further detail below to complete a series of flight maneuvers and/or a flight.

Still referring to FIG. 1, the apparatus 100 may include a database 108 of flight plan elements. For example, the flight plan 120 may include the aircraft intended speed and cruising altitude, aircraft route, acceleration, and the like thereof. The recommended flight plans include an analysis of previous flights that minimizes the cost to reach an objective. Recommended flight plan may also include at least one flight plan calculated as a function of previous flight plan records. For example, previous flights may be flown at different attitudes, some of which may be faster than others. Flight controller 112 may put together different flight plan elements to create a cost-effective flight plan. Flight plan may be created from a collection of different flight plan elements. Alternatively, or additionally, recommended flight plans are generated based on a machine learning model of different elements. Such elements can include destinations, waypoints, charging stations, great circles, etc. Machine learning is described in further detail in FIG. 4. Database 108 may be contained on the airplane or offsite. The recommended flight plan are the most cost-effective plans.

A recommended flight plan may be generated using a machine-learning model as described below in reference to FIG. 4. Machine-learning model may be trained using training data. Training data may be made up of a plurality of training examples that each include examples of data to be input to the machine learning model (such as position data and/or other data like data from other sensors, weather data, data about energy reserves/state of health of aircraft, etc.) and examples of data to be output therefrom (such as flight plans, etc.). Training data may be implemented in any manner described below. Training data may be obtained from and/or in the form of previous flight plan data or sections of previous flight plan data in combination with correlated past input sensor 104 data. Examples of flight data that may be used in training data may include position datum 124, including weather data, data about energy reserves/state of health of aircraft, data about state of charge, and the like. a. Additional disclosure related to state of health and state of charge function can be found in U.S. patent application Ser. No. 17/241,396 entitled "SYSTEM AND METHOD FOR STATE DETERMINATION OF A BATTERY MODULE CONFIGURED FOR USED IN AN ELECTRIC VEHICLE", entirety of which incorporated herein by reference. Training data may be compared to current status of flight in order to output a recommended flight plan. Current status of flight may include any sensor data mentioned in this disclosure.

Still referring to FIG. 1, database 108 may include battery status information. As used in the current disclosure, "battery status information" is defined as the state of charge, state of health, temperature, and the like of the batteries. In a non-limiting embodiment, battery status information may include information regarding the power level of the battery. The power level of the battery may also be reflected as flight time or flight miles remaining until charging is needed. In other embodiments, battery status information may include information regarding the maximum amount of power the batteries hold compared to when the batteries were new. This reading will give the pilot an outlook of the battery's overall health.

Still referring to FIG. 1, database 108 may include information describing at least an area to avoid while in flight. Areas to avoid while in flight include areas of that have high head winds, severe weather conditions, excessively turbulent areas, restricted areas, and the like. In embodiments, areas to avoid while in flight may be displayed to the pilot in a user interface. Areas to avoid while in flight may be continuously updated during flight as conditions in the air change.

Still referring to FIG. 1, database 108 may include information describing at least the payload of the aircraft. As used in the current description, "payload" is the considered the sum of the weight of the live load within the aircraft. A nonlimiting example, of a payload may be the weight of the cargo, batteries, passengers, and the like. In embodiments, the payload of the aircraft may be reflected to the user interface in a unit of measurement for weight. In other embodiments, the payload weight may be used to calculate flight time and battery considerations.

Still referring to FIG. 1, database 108 may include information describing weather along the flight path. As used in this disclosure, "weather" is defined as the state of the atmosphere at a place and time as regards temperature, coolness, heat, dryness, sunshine, wind, snow, hail, rain, and the like. Weather may also include but is not limited to ambient temperature, average temperature at different altitudes, wind speed, humidity, etc. As used in the current disclosure, "weather datum" is the datum that is used to calculate the weather at a given time such as wind speed, humidity, temperature at a given altitude, temperature on the ground, and the like. In some embodiments, weather maybe calculated outside the apparatus then communicated to computing device. In other embodiments, computing device derives the weather as a function of the weather datum. The various weather events may cause the changes in the flight path to ensure a safe and comfortable ride. Flight plan 120 may change continuously based upon the weather conditions.

Still referring to FIG. 1, database 108 may include recharging station data. As used in the current disclosure, "recharging station data" is data regarding the location and status of recharging stations for the electric aircraft. In embodiments, recharging station data may include whether a recharging station is open and available for recharging the electric aircraft. In other embodiments, recharging station data may direct the electric aircraft to recharging stations as a function of the status of the battery. For example, if the charge of the battery is depleted the recharging station data may indicate to the pilot that the electric aircraft needs to recharge and a location of the recharging station.

Continuing to refer to FIG. 1, the flight controller 112 is configured to determine a recommended flight plan based on cost-effectiveness. As used in this disclosure, "cost-effective" refers to a recommended flight plan that is the most efficient in terms of a factor. A "factor," as used in this disclosure, is the limiting constraint on a given flight. For example, without limitation, some factors that make a cost-effective flight plan may include shortest trip time, stopping at a charging station that is most direct to the destination, avoiding obstacles, etc. Cost factors may also refer to financial cost, energy cost, time cost, resource cost (including manpower cost, airport cost, landing pad cost, etc.), maintenance cost, depreciation cost, or the like. Cost-effective may also refer to the payload the aircraft is carrying. The payload may depreciate/be damaged with time, weather conditions (i.e. turbulence), and the like. In this embodiment, a cost-effective flight plan may be the fastest path or may be a slower path with less turbulence.

Continuing to refer to FIG. 1, cost-effective flight plan may be the fastest route to the destination. This may be determined using previous flight plans within database 108, as well as real-time sensor 104 data. In some embodiments, aircraft type may be considered. For example, an eVTOL aircraft may be preferred over traditional aircrafts if it is faster to vertically take-off rather than on a runway. An estimated time to destination may be determined using historic data on flights to a destination. Historic data may also show likeliness of weather patterns, likeliness of obstacles, or the like. Historic data may also show likely energy expenditure by the aircraft at different phases of flight and the likeliness a waystation is needed to charge or fuel the aircraft.

Still referring to FIG. 1, a cost-effective flight plan may be determined using various models. A model to determine a cost-effective flight plan may use known parameters for inputs and then calculate flight plans and cost estimates. Known parameters may include destinations, areas to avoid, and/or other data found in database 108. Cost estimate may include a computer-generated number that may be associated with a monetary cost of a flight plan. A model to determine a cost-effective flight plan may also be configured to optimize an objective function of cost elements. Cost elements may include any of the data mentioned above relating to cost. Model may be set to minimize or maximize the objective function output using linear optimization, mixed integer optimization, or the like.

Continuing to refer to FIG. 1, generation of objective function may include generation of a function to score and weight factors to achieve a route score for each cost element. In some embodiments, cost elements may be scored in a matrix for optimization, where columns represent routes and rows represent cost elements potentially paired therewith; each cell of such a matrix may represent a score of a pairing of the corresponding route to the corresponding cost elements.

Still referring to FIG. 1, assigning predicted route that optimizes the objective function further comprises performing a greedy algorithm process. A "greedy algorithm" is defined as an algorithm that selects locally optimal choices, which may or may not generate a globally optimal solution. For instance, flight controller 112 may select pairings so that scores associated therewith are the best score for each cost element. In such an example, optimization may determine the combination of routes such that each plan pairing includes the highest score possible.

Still referring to FIG. 1, objective function may be formulated as a linear objective function, which flight controller 112 may solve using a linear program such as, without limitation, a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is the set of all routes r, S is a set of all cost estimates s, $c_{rs}$ is a score of a pairing of a given route with a given cost estimate, and $x_{rs}$ is 1 if a route r is paired with cost estimate s, and 0 otherwise. Continuing the example, constraints may specify that each route is assigned to only one cost element, and each cost element is assigned only one route; routes may include compound routes as described above. Sets of routes may be optimized for a maximum score combination of all generated routes. In various embodiments, apparatus 100 may determine combination of routes that maximizes a total score subject to a cost element constraint. A mathematical solver may be implemented to solve for the set of feasible pairings that maximizes the sum of scores across all pairings; mathematical solver may implemented on flight controller 112 and/or another device in apparatus 100, and/or may be implemented on third-party solver.

Still referring to FIG. 1, optimizing objective function may include minimizing a loss function, where a "loss function" is an expression that an output of which, an optimization algorithm minimizes, to generate an optimal result. As a non-limiting example, flight controller 112 may assign variables relating to a set of parameters, which may correspond to score components as described above, calculate an output of mathematical expression using the variables, and select a pairing that produces an output having the lowest size. Size may, for instance, included absolute value, numerical size, or the like. Selection of different loss functions may result in identification of different potential pairings as generating minimal outputs. Objectives represented in an objective function and/or loss function may include minimization of turbulence or minimization of headwind. Objectives may include minimization of waypoints needed. Objectives may include minimization of energy expenditure; energy expenditure may depend on speed, altitude, or phase of flight, etc.

Continuing to refer to FIG. 1, a cost-effective flight plan may be generated using a machine-learning model as described below in reference to FIG. 4, using training data 404. Training data 404 is made up of a plurality of training examples that each include examples of data to be input to the machine learning model (such as position data and/or other data like data from other sensors, weather data, data about energy reserves/state of health of aircraft, previous flight plan data, etc.) and examples of data to be output therefrom (such as time to destination, number of waypoints needed, number of flight personnel needed, etc.). Training data 404 may be implemented in any manner described below. Training data 404 may be obtained through previous flight plan data or sections of previous flight plan data in combination with input sensor 104 data. Output data may be used to calculate the cost estimate of flight plans.

Continuing to refer to FIG. 1, the flight controller 112 may be further configured to determine a recommended flight plan as a function of cost estimates that may be determined using methods stated above. Flight controller may pick the lowest cost estimate plan or may weight cost estimate against other factors that may impact the flight plan. Other factors may include flight schedules, connecting flights, crew personnel availability/schedules, maintenance times, charge times of electric aircrafts, and the like. Flight controller may use another optimization function, such as those mentioned above, to score cost estimates against the aforementioned factors.

With continued reference to FIG. 1, the controller 112 may be configured to generate an autonomous function. As used in this disclosure an "autonomous function" is a mode and/or function of flight controller 112 that controls aircraft automatically. For example, and without limitation, autonomous function may perform one or more aircraft maneuvers, take offs, landings, altitude adjustments, flight leveling adjustments, turns, climbs, and/or descents in order to execute to the recommended flight plan. As a further non-limiting example, autonomous function may adjust one or more airspeed velocities, thrusts, torques, and/or groundspeed velocities. As a further non-limiting example, autonomous function may perform one or more flight plan corrections and/or flight plan modifications as a function of flight element. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 112 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 112 will control the ailerons and/or rudders. As used in this disclosure "non-autonomous mode" is a mode that denotes a pilot will control aircraft and/or maneuvers of aircraft in its entirety. Additional disclosure related to autonomous and semi-autonomous function can be found in U.S. patent application Ser. No. 17/524,355 entitled "SYSTEMS AND METHODS FOR SIMULATING AN ELECTRICAL VERTICAL TAKEOFF AND LANDING (EVTOL) AIRCRAFT," entirety of which incorporated herein by reference.

Figure 2:
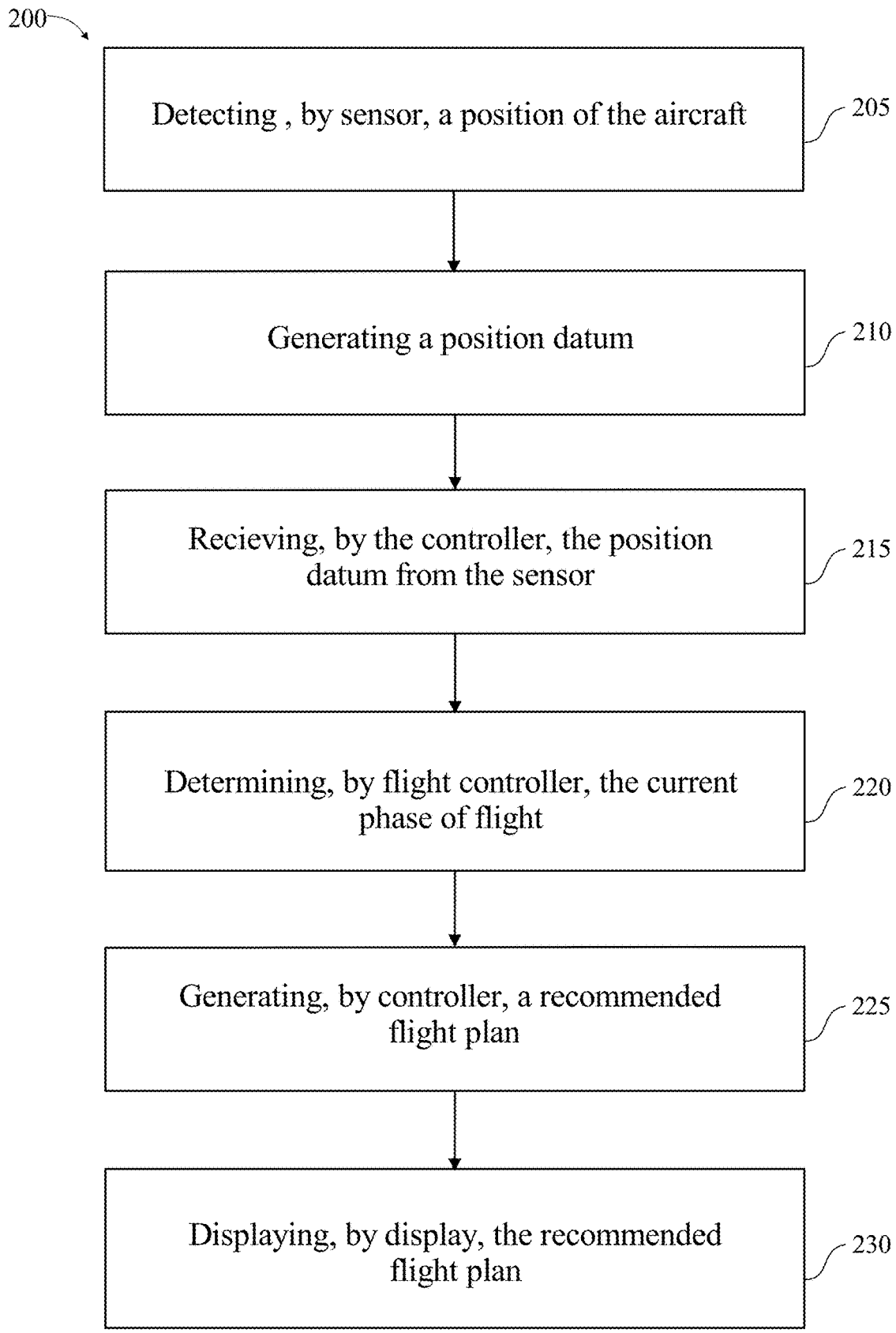
FIG. 2 is a process flow diagram illustrating an exemplary embodiment of generating a flight plan.

Now referring to FIG. 2, a process flow diagram illustrating an exemplary embodiment of a method 200 of generating a flight plan. Method 200, at step 205, is configured to detect a position of the aircraft using a sensor. Position includes the altitude, velocity, and the like.

With continued reference to FIG. 2, method 200 includes, at step 210, generating a position datum based on the sensor data. Position datum may include any position datum as described herein.

With continued reference to FIG. 2, method 200 includes, at step 215, receiving, by controller 112, the position datum from the sensor. Other data, such weather data, data about energy reserves/state of health of aircraft, etc. may also be received by the controller.

Still referring to FIG. 2, at step 220, method 200 includes determining, by flight controller 112, the current phase of flight.

Still referring to FIG. 2, at step 225, method 200 includes generating a recommended flight plan. The recommended flight plan is generated using methods such as previous flight plans, machine learning models, and the like. Recommended flight plan is one that is the most cost-effective. Cost-effectiveness determined by a plurality of factors discussed in this disclosure.

Continuing to refer to FIG. 2, at step 230, method 200 includes displaying, by display 116, the recommended flight plan. Display may also show other data as determined by the controller/pilot.

With continued reference to FIG. 1, an exemplary representation of flight controller 112 may determine a recommended flight plan as a function of a charging station. In a nonlimiting example, flight controller 112 calculates a flight plan for an aircraft to follow with information available at the time of the calculation and once at least a sensor 104 detects current position in the flight plan, the flight controller 112 will calculate a recommended flight plan that selects the closest charging station. In one embodiment, the flight controller 112 may adjust a section of the flight plan based on shortest plan to destination with a required waypoint (charging station). In some embodiments, the flight controller 112 may calculate a recommended flight plan that is a completely new flight plan based on at least a charging station and a plurality of other factors discussed in this disclosure.

Still referring to FIG. 1, the apparatus 100 contains a display 116. Display 116 may include a separate device that includes a transparent screen configured to display computer generated images and/or information. As used in this disclosure, a "display" is an image-generating device for the visual representation of at least a datum. In a nonlimiting example, image-generating device may include augmented reality device, various analog devices (e.g., cathode-ray tube, etc.), and digital devices (e.g., liquid crystal, active-matrix plasma, etc.). An "augmented reality" device, as used in this disclosure, is a device that permits a user to view a typical field of vision of the user and superimposes virtual images on the field of vision. Augmented reality device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. In a non-limiting embodiment, the display 116 may be placed in front of the pilot wherein the pilot may view the information displayed. In a non-limiting embodiment, the display 116 may be placed between the pilot and the central point of the exterior view window, wherein the exterior view window is configured to provide visibility of the outside environment while the display 116 is configured to display information, wherein the information is related to the outside environment. The pilot may view the information and the outside environment with minimal bodily movement of the head of the pilot. The display 116 may include a plurality of lines, images, symbols, etc. The lines, images, and symbols may be used to denote the current position, direction, location, state of charge etc., of the electric aircraft. The display 116 may further display information describing the aircraft and its functionalities in real-time. The display 116 may include alternative information related to communication. The display 116 may include one or more projection devices within the display and/or screen of the display 116 to display the flight information. Persons skilled in the art, upon reviewing the entirety of this disclosure, will be aware of the various embodiments various flight information may be displayed and placed on the display for purposes as described herein. Additional disclosure related to flight displays can be found in U.S. patent application Ser. No. 17/575,066 entitled "SYSTEM FOR ESTABLISHING A PRIMARY FLIGHT DISPLAY IN AN ELECTRICAL VERTICAL TAKEOFF AND LANDING AIRCRAFT," entirety of which incorporated herein by reference.

Figure 3:
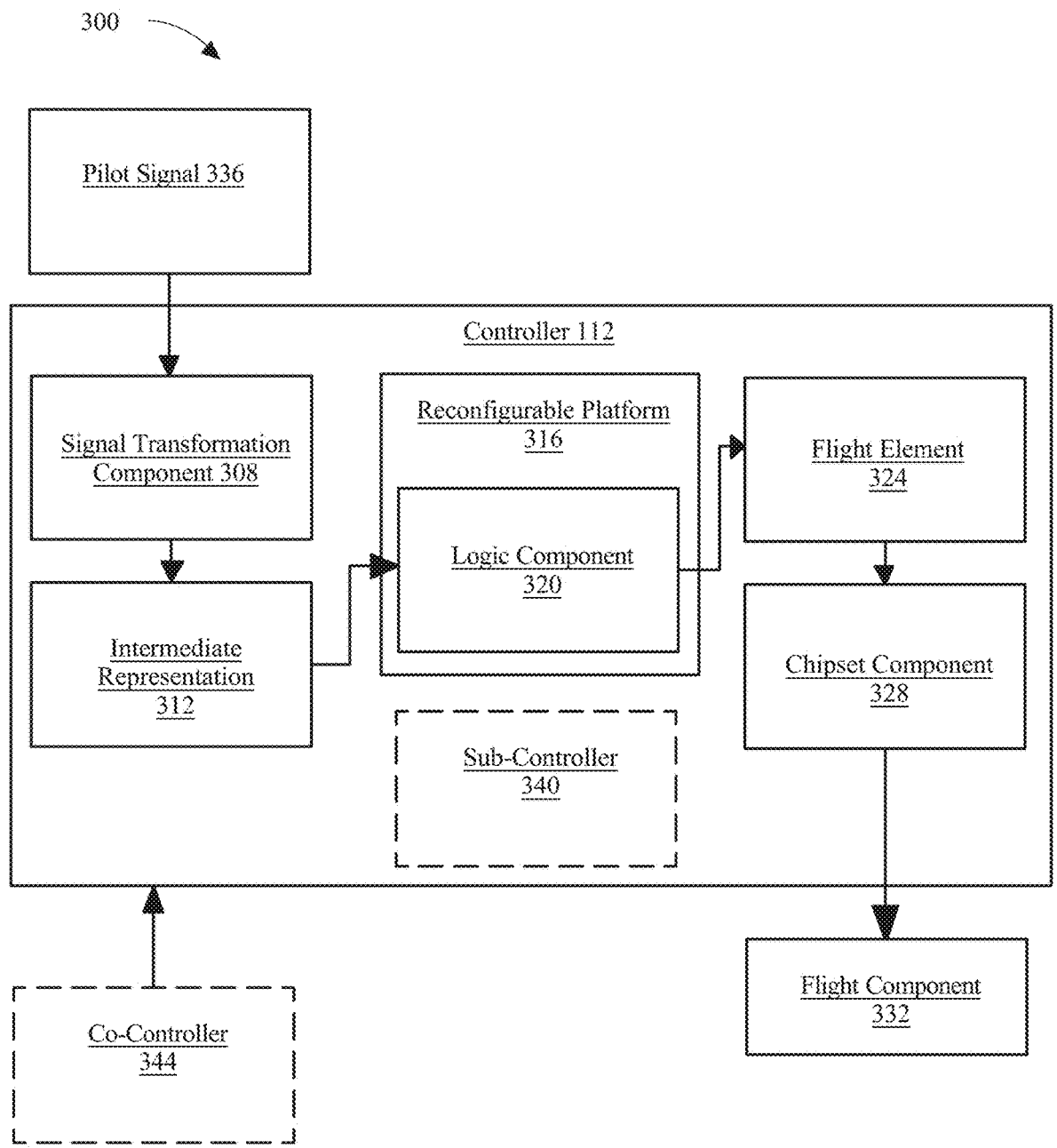
FIG. 3 is an exemplary representation of a flight controller.

Now referring to FIG. 3, an exemplary embodiment 300 of a flight controller 112 is illustrated. As used in this disclosure a "flight controller" is a computing device of a plurality of computing devices dedicated to data storage, security, distribution of traffic for load balancing, and flight instruction. Flight controller 112 may include and/or communicate with any computing device as described in this disclosure, including without limitation a microcontroller, microprocessor, digital signal processor (DSP) and/or system on a chip (SoC) as described in this disclosure. Further, flight controller 112 may include a single computing device operating independently, or may include two or more computing device operating in concert, in parallel, sequentially or the like; two or more computing devices may be included together in a single computing device or in two or more computing devices. In embodiments, flight controller 112 may be installed in an aircraft, may control the aircraft remotely, and/or may include an element installed in the aircraft and a remote element in communication therewith.

In an embodiment, and still referring to FIG. 3, flight controller 112 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 112. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 112 may include a reconfigurable hardware platform 316. A "reconfigurable hardware platform," as used herein, is a component and/or unit of hardware that may be reprogrammed, such that, for instance, a data plan between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 112. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight plan accurately and/or sufficiently.

Still referring to FIG. 3, flight controller 112 may include a chipset component 328. As used in this disclosure a "chipset component" is a component that manages data flow. In an embodiment, and without limitation, chipset component 328 may include a northbridge data flow plan, wherein the northbridge dataflow plan may manage data flow from logic component 320 to a high-speed device and/or component, such as a RAM, graphics controller, and the like thereof. In another embodiment, and without limitation, chipset component 328 may include a southbridge data flow plan, wherein the southbridge dataflow plan may manage data flow from logic component 320 to lower-speed peripheral buses, such as a peripheral component interconnect (PCI), industry standard architecture (ICA), and the like thereof. In an embodiment, and without limitation, southbridge data flow plan may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 112 may be configured generate an autonomous function. As used in this disclosure an "autonomous function" is a mode and/or function of flight controller 112 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight plan corrections and/or flight plan modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 112 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 112 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 112 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 112 to control and/or maintain a portion of aircraft, a portion of the flight plan, the entire aircraft, and/or the entire flight plan. As a further non-limiting example, pilot signal 336 may include an implicit signal, wherein flight controller 112 detects a lack of control such as by a malfunction, torque alteration, flight plan deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 112 and/or a remote device may or may not use in the generation of autonomous function. As used in this disclosure "remote device" is an external device to flight controller 112. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 112 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 112 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 112. Remote device and/or FPGA may transmit a signal, bit, datum, or parameter to flight controller 112 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 112 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 112 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 112 may include, but is not limited to, for example, a cluster of flight controllers in a first location and a second flight controller or cluster of flight controllers in a second location. Flight controller 112 may include one or more flight controllers dedicated to data storage, security, distribution of traffic for load balancing, and the like. Flight controller 112 may be configured to distribute one or more computing tasks as described below across a plurality of flight controllers, which may operate in parallel, in series, redundantly, or in any other manner used for distribution of tasks or memory between computing devices. For example, and without limitation, flight controller 112 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain plan, wherein a "chain plan," as used herein, is a linear communication plan comprising a hierarchy that data may flow through. In an embodiment, and without limitation, the plurality of flight controllers may include an all-channel plan, wherein an "all-channel plan," as used herein, is a communication plan that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 112. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 112 may also be implemented using a "shared nothing" architecture in which data is cached at the worker, in an embodiment, this may enable scalability of aircraft and/or computing device. Flight controller 112 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 112 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 112 as components and/or nodes of a distributer flight controller as described above. For example, and without limitation, co-controller 344 may include one or more controllers and/or components that are similar to flight controller 112. As a further non-limiting example, co-controller 344 may include any controller and/or component that joins flight controller 112 to distributer flight controller. As a further non-limiting example, co-controller 344 may include one or more processors, logic components and/or computing devices capable of receiving, processing, and/or transmitting data to and/or from flight controller 112 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 112 may be designed and/or configured to perform any method, method step, or sequence of method steps in any embodiment described in this disclosure, in any order and with any degree of repetition. For instance, flight controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
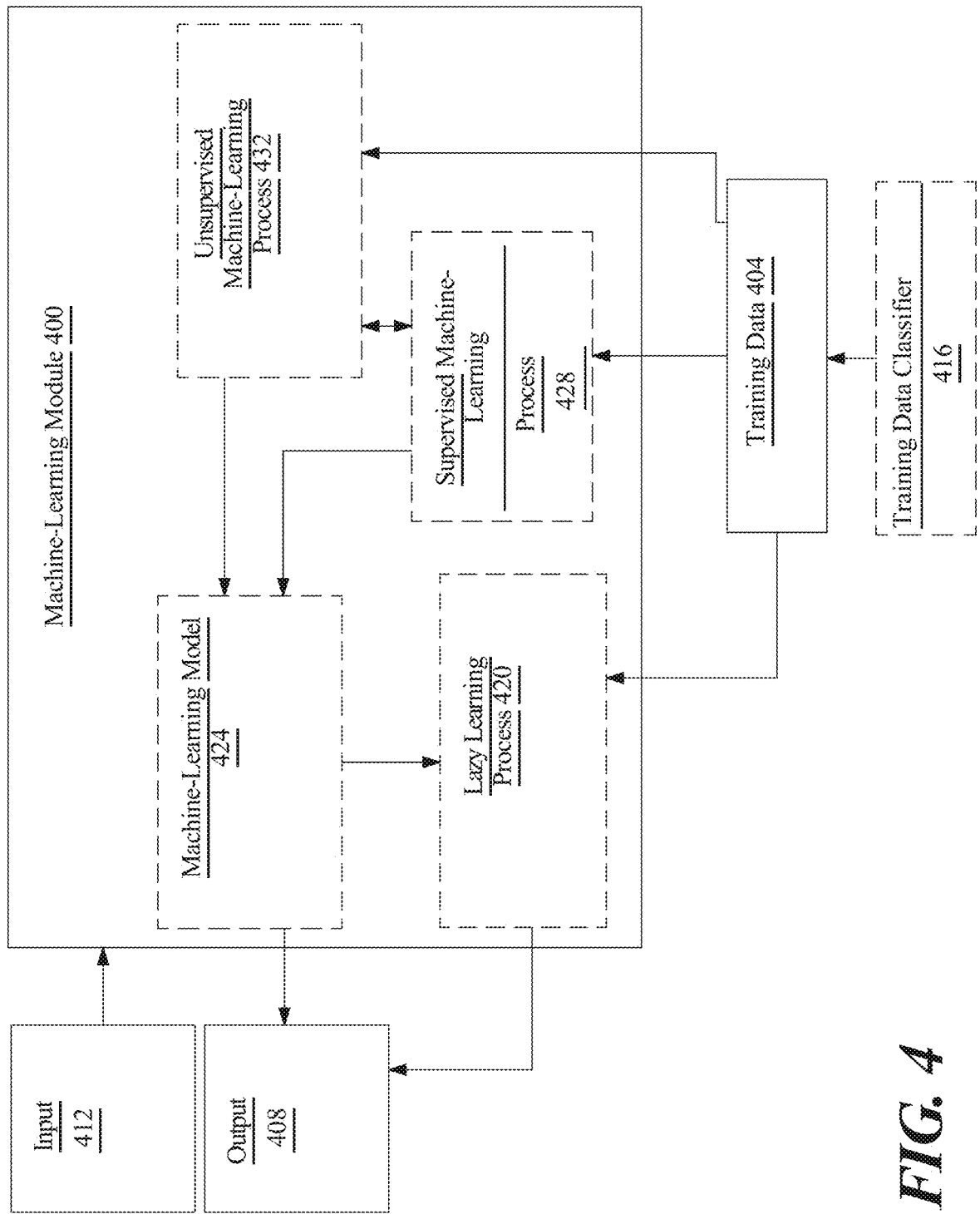
FIG. 4 is an exemplary representation of a machine learning module.
Figure 5:
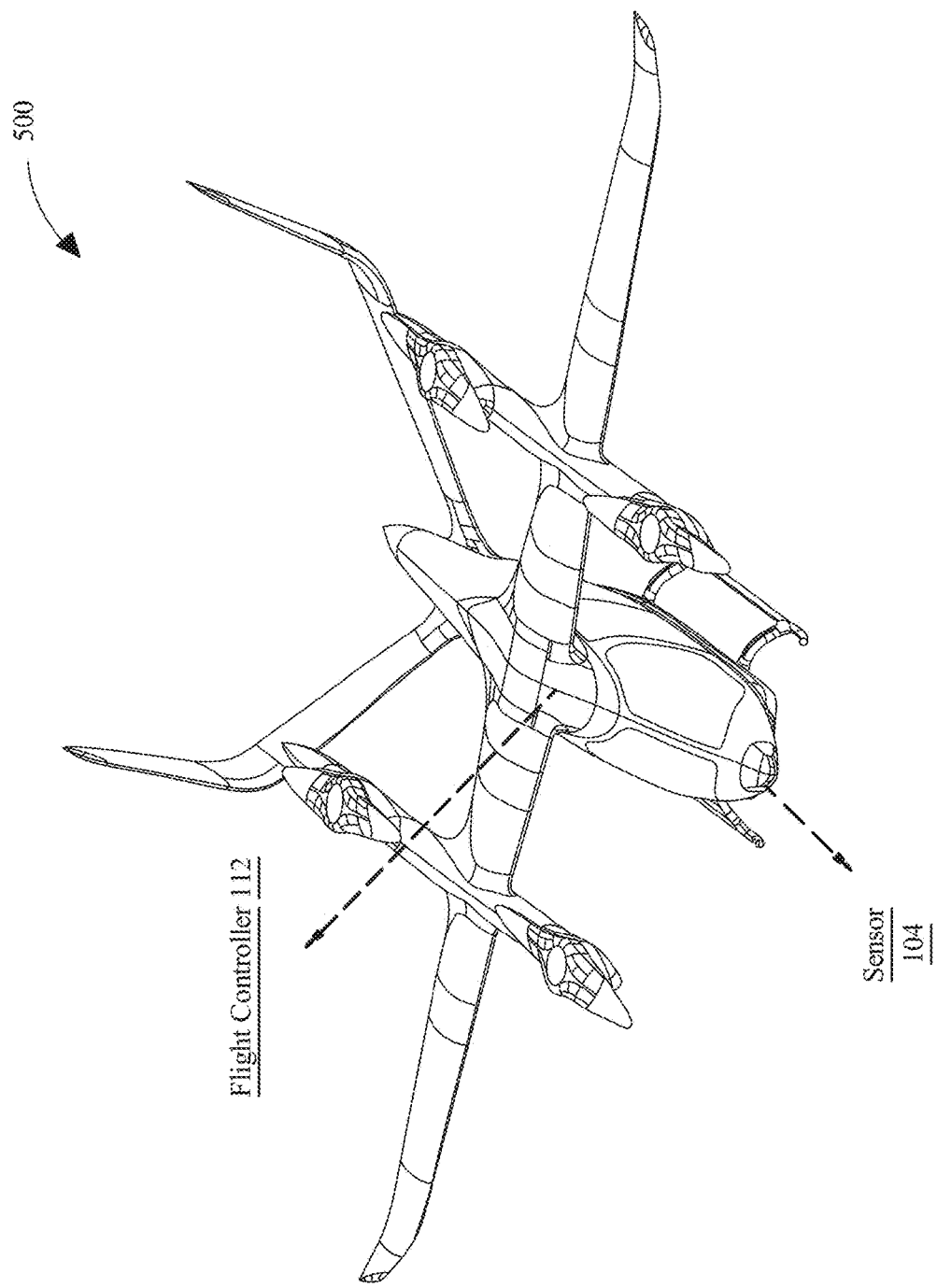
FIG. 5 is an exemplary illustration of an electric aircraft.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 315 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
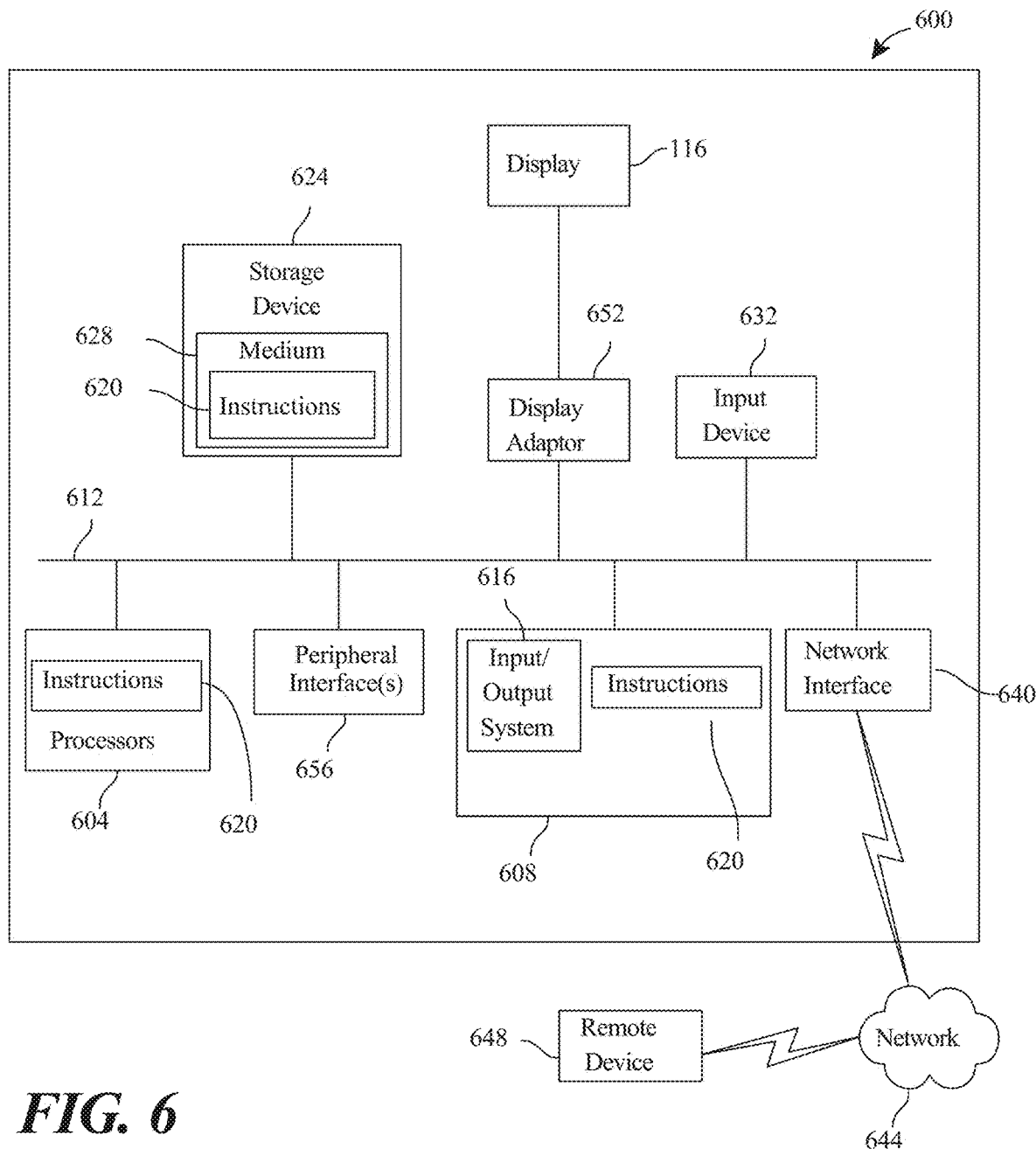
FIG. 6 is a block diagram of a computing system that can be used to implement any one or more of the methodologies disclosed herein and any one or more portions thereof.
Figure 7:
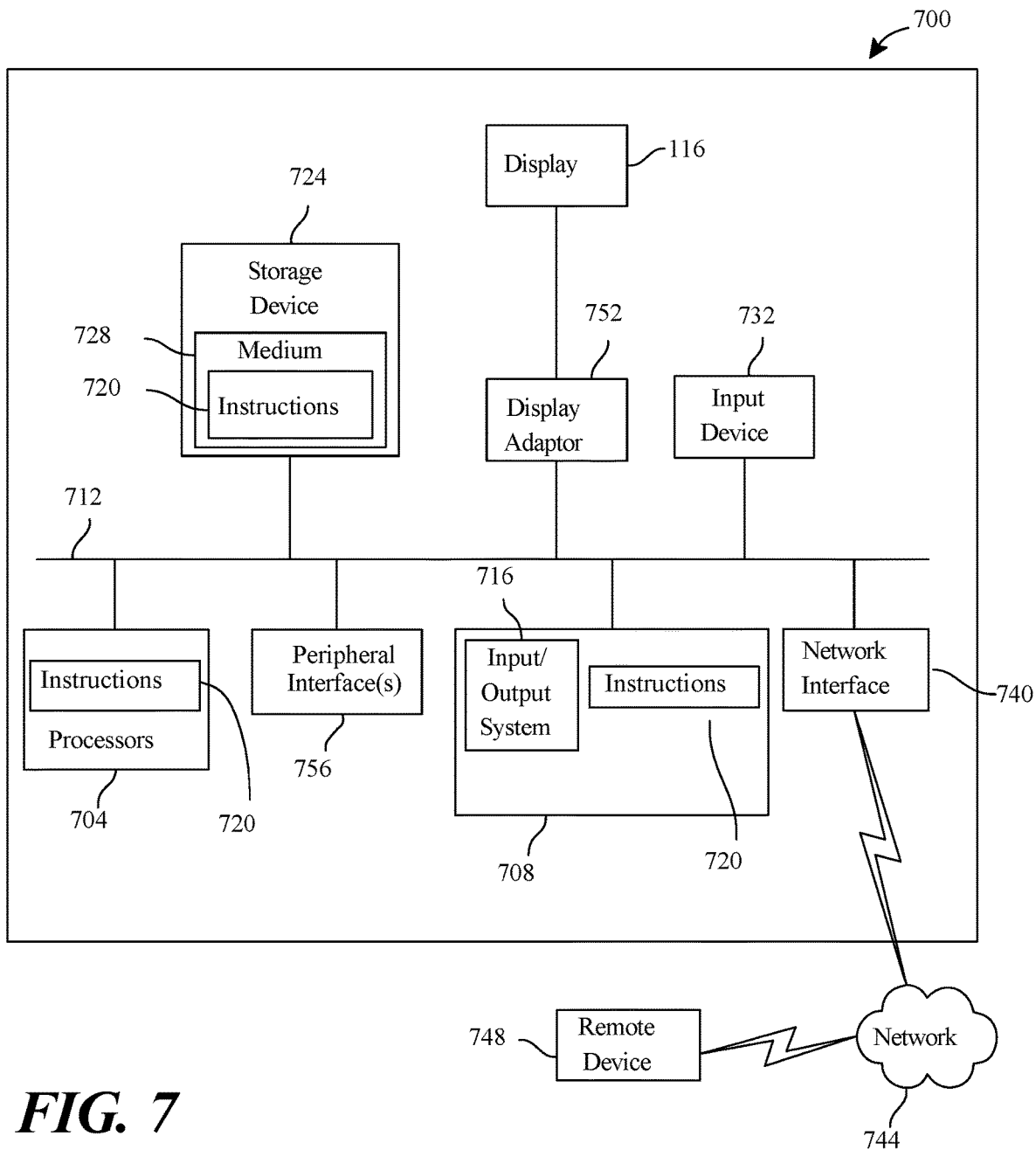

Referring now to FIG. 6, an embodiment of an aircraft is presented. A number of aerodynamic forces may act upon the electric aircraft during flight. Forces acting on an electric aircraft during flight may include, without limitation, thrust, the forward force produced by the rotating element of the aircraft and acts parallel to the longitudinal axis. Another force acting upon aircraft may be, without limitation, drag, which may be defined as a rearward retarding force which is caused by disruption of airflow by any protruding surface of the aircraft such as, without limitation, the wing, rotor, and fuselage. Drag may oppose thrust and acts rearward parallel to the relative wind. A further force acting upon aircraft may include, without limitation, weight, which may include a combined load of the aircraft itself, crew, baggage, and/or fuel. Weight may pull aircraft downward due to the force of gravity. An additional force acting on aircraft may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft are designed to be as lightweight as possible. Reducing the weight of the aircraft and designing to reduce the number of components is essential to optimize the weight. To save energy, it may be useful to reduce weight of components of an aircraft, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on aircraft.

Still referring to FIG. 6, aircraft may include at least a sensor 104 coupled to the aircraft. In one embodiment, aircraft may include a flight controller, where the flight controller may be configured to operate the aircraft as a function of the data transmitted by the at least a sensor 104 coupled to the aircraft.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 116, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 116. Examples of a display device include, but are not limited to, a liquid crystal display (LCD), a cathode ray tube (CRT), a plasma display, a light emitting diode (LED) display, and any combinations thereof. Display adapter 652 and display device 116 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an electric aircraft flight plan, the apparatus comprising:
   a sensor installed in an electric aircraft and configured to detect a position of the electric aircraft and generate a position datum based on the position of the electric aircraft;
   a controller installed on the electric aircraft and communicatively connected to the sensor, the controller configured to:
      receive the position datum from the sensor;
      determine a current phase of flight of the electric aircraft based on the position datum, wherein the current flight phase comprises fixed wing based flight, rotor based flight, or a transition of the phase of flight; and
      generate a recommended flight plan based on the electric aircraft's current phase of flight and a location of a charging station, wherein generating the recommended flight plan occurs on the electric aircraft during flight and further comprises:
         determining a maximally cost-effective flight plan as a function of the position datum and the current phase of flight, wherein determining the maximally cost-effective flight plan further comprises generating a route score as a function of a plurality of pairs of a route and a corresponding cost element; and
         generating the recommended flight plan as a function of the maximally cost-effective flight plan; and
      a display located within the electric aircraft, connected to the controller and configured to display the recommended flight plan to a pilot within the electric aircraft.

2. The apparatus of claim 1, wherein the electric aircraft includes an electronic vertical takeoff and landing (eVTOL) aircraft.

3. The apparatus of claim 1, wherein the sensor includes a plurality of sensors.

4. The apparatus of claim 1, wherein the position of the electric aircraft includes an orientation of the electric aircraft relative to a reference element.

5. The apparatus of claim 1, wherein the position datum includes a velocity of the electric aircraft.

6. The apparatus of claim 1, wherein the position datum includes a phase of flight.

7. The apparatus of claim 1, wherein generating the recommended flight plan further comprises generating the recommended flight plan as a function of a machine-learning model.

8. The apparatus of claim 1, wherein generating the recommended flight plan includes generating the recommended flight plan based on analysis of at least a previous flight.

9. The apparatus of claim 1, wherein the controller is configured to generate an autonomous function.

10. The apparatus of claim 1, wherein the controller is further configured to control at least a flight component as a function of a pilot input associated with the pilot located within the electric aircraft.

11. A method for generating an electric aircraft flight plan, the method comprising:
   detecting, using a sensor, a position of the electric aircraft;
   generating, using the sensor, a position datum based on a position of the electric aircraft;
   receiving, by a controller, a position datum from the sensor;
   determining, by a controller, a current phase of flight of the electric aircraft using the position datum, wherein the current flight phase comprises fixed wing based flight, rotor based flight, or a transition of the phase of flight; and
   generating, by the controller on the electric aircraft during flight, a recommended flight plan based on the electric aircraft's current phase of flight and a location of a charging station, wherein the recommended flight plan further comprises:
      determining a maximally cost-effective plan as a function of the position datum and the current phase of flight, wherein determining the maximally cost-effective plan further comprises generating a route score as a function of a plurality of pairs of a route and a corresponding cost element; and generating the recommended flight plan as a function of the maximally cost-effective plan; and displaying, by a display located within the electric aircraft and connected to the controller, the recommended flight plan to a pilot within the electric aircraft.

12. The method of claim 11, wherein the electric aircraft includes an electronic vertical takeoff and landing (eVTOL) aircraft.

13. The method of claim 11, wherein the sensor includes a plurality of sensors.

14. The method of claim 11, wherein the position of the electric aircraft includes an orientation of the electric aircraft relative to a reference element.

15. The method of claim 11, wherein the position datum includes a velocity of the electric aircraft.

16. The method of claim 11, wherein the position datum includes a phase of flight.

17. The method of claim 11, wherein generating the recommended flight plan further comprises generating the recommended flight plan as a function of a machine-learning model.

18. The method of claim 11, wherein generating the recommended flight plan includes generating the recommended flight plan based on analysis of at least a previous flight.

19. The method of claim 11, wherein the controller is configured to generate an autonomous function.

20. The method of claim 11, further comprising controlling, using the controller, at least a flight component as a function of a pilot input associated with the pilot located within the electric aircraft.

* * * * *